(12) United States Patent
Tomita et al.

(10) Patent No.: US 9,057,285 B2
(45) Date of Patent: Jun. 16, 2015

(54) LUBRICANT SYSTEM

(75) Inventors: Kouhei Tomita, Fuchu (JP); Toshihiko Endo, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 666 days.

(21) Appl. No.: 13/202,097

(22) PCT Filed: Feb. 18, 2010

(86) PCT No.: PCT/JP2010/052431
§ 371 (c)(1),
(2), (4) Date: Aug. 18, 2011

(87) PCT Pub. No.: WO2010/095679
PCT Pub. Date: Aug. 26, 2010

(65) Prior Publication Data
US 2011/0305585 A1  Dec. 15, 2011

(30) Foreign Application Priority Data

Feb. 18, 2009  (JP) .................. 2009-035489

(51) Int. Cl.
*F04B 49/00* (2006.01)
*F01D 25/20* (2006.01)
(Continued)

(52) U.S. Cl.
CPC ............. *F01D 25/20* (2013.01); *F04B 49/08* (2013.01); *F04B 49/02* (2013.01); *F16N 13/18* (2013.01); *F16N 13/00* (2013.01); *F05D 2220/31* (2013.01)

(58) Field of Classification Search
CPC .......... F04B 49/02; F04B 49/08; F04B 49/20; F16N 13/00; F16N 13/18

USPC ........ 417/2–5, 7, 44.2; 184/26, 27.2, 6.3, 6.4, 184/7.4
See application file for complete search history.

(56) References Cited

U.S. PATENT DOCUMENTS 6,520,930 B2 * 2/2003 Critchlow et al. .............. 604/67

FOREIGN PATENT DOCUMENTS

| JP | 63 085204 | 4/1988 |
|---|---|---|
| JP | 5 17102 | 3/1993 |

(Continued)

OTHER PUBLICATIONS

International Search Report issued May 25, 2010 in PCT/JP10/52431 filed Feb. 18, 2010.

(Continued)

*Primary Examiner* — Devon Kramer
*Assistant Examiner* — Patrick Hamo
(74) *Attorney, Agent, or Firm* — Oblon, McClelland, Maier & Neustadt, L.L.P.

(57) ABSTRACT

There is proposed a lubricant system having a plurality of motor-driven pumps operating in parallel as main oil pumps, wherein even if at least one of the main oil pumps stops, the other normally operating main oil pumps do not stop due to overload of a motor. A lubricant system 7 comprises a hydraulic pressure piping 9, a plurality of lubricant pumps 10 arranged in parallel, a plurality of AC motors 11 driving each of the lubricant pumps 10, an error detector 24 detecting a presence or absence of an error in an operating state of each of the AC motors 11, a pressure loss addition unit 25 configured to increase pressure loss in the hydraulic pressure piping 9, and a controller 26 causing the pressure loss addition unit 25 to increase pressure loss when the error detector 24 detects an error in at least one of the AC motors 11. When an error occurs in at least one of the AC motors 11, the lubricant system 7 changes each working point of the lubricant pumps 10 driven by another AC motor 11 to a lower flow side than that in a steady operation.

8 Claims, 11 Drawing Sheets

(51) Int. Cl.
*F04B 49/08* (2006.01)
*F16N 13/18* (2006.01)
*F04B 49/02* (2006.01)
*F16N 13/00* (2006.01)

(56) References Cited

FOREIGN PATENT DOCUMENTS

| JP | 8 221135 | 8/1996 |
| JP | 2000 240586 | 9/2000 |
| JP | 2005 140082 | 6/2005 |

OTHER PUBLICATIONS

International Preliminary Report on Patentability and Written Opinion issued Sep. 13, 2011 in patent application No. PCT/JP2010/052431 filed Feb. 18, 2010.

\* cited by examiner

LUBRICANT SYSTEM

TECHNICAL FIELD

The present invention relates to a lubricant system having a plurality of motor-driven pumps operating in parallel.

BACKGROUND ART

A steam turbine installed in a power generation facility such as a nuclear power plant and a thermal power plant requires lubricant to be continuously and stably supplied to turbine bearings thereof for the purpose of steam turbine protection. In light of this, a lubricant system is installed in a power generation facility.

A conventional lubricant system has two motor-driven pumps as main oil pumps, one for a service pump and one for a standby pump. In addition, the lubricant system has a DC motor-driven emergency pump for emergency use (for example, see Patent Literature 1).

There has been known a cold and hot water pump apparatus for use in an air conditioning facility including a plurality of cold and hot water pumps operating in parallel and a two-way valve controlling to a constant pressure on a discharge side of each cold and hot water pump.

CITATION LIST

Patent Literature

Patent Literature 1: Japanese Patent Laid-Open No. 2005-140082
Patent Literature 2: Japanese Patent Laid-Open No. 2000-240586

SUMMARY OF INVENTION

Technical Problem

With a recent trend to large-sized steam turbines focusing on power increase, the amount of lubricant required to lubricate turbine bearings tends to increase. Thus, the lubricant system requires a main oil pump to have a capacity large enough to supply lubricant to the turbine bearings.

A possible problem with a large-sized main oil pump includes an increase in vibration, and a deteriorated response of the lubricant system caused by delayed pump activation time due to increased moment of inertia of a rotation system, or the like.

In light of this, in order to increase the amount of lubricant, there is considered a lubricant system having a plurality of main oil pumps operating in parallel, each main oil pump having a small capacity (a flow of about 50% with respect to a required lubricant flow of 100%) instead of a large capacity.

However, the lubricant system having a plurality of main oil pumps operating in parallel may cause a problem in that, for example, when one of the main oil pumps stops due to an error and the operation continues only with the other normal pumps, a motor driving the normally operating main oil pumps may stop due to overload. This is because when at least one of the main oil pumps operating in parallel stops due to an error, the other normally operating main oil pumps increase flow according to the working point on a head-capacity curve (pump characteristics represented by the relation between flow and head) to balance the entire head of the lubricant system, leading to an increase in power required for the motor, and the power required for the motor exceeds a rated power. When the motor stops and the main oil pumps stop discharging lubricant, the turbine bearings are not lubricated, leading to damage of the steam turbine. The consideration of an error occurring in the lubricant system having a plurality of main oil pumps operating in parallel involves a need to excessively increase the capacity of each main oil pump and power of the motor, which offsets the advantage of individual small-sized main oil pumps by parallel operating main oil pumps.

Meanwhile, the cold and hot water pump apparatus providing each cold and hot water pump with a two-way valve controlling to a constant pressure on a discharge side requires a plurality of two-way valves to be independently controlled for rated operation of each cold and hot water pump. In other word, it is difficult to control the plurality of two-way valves in a uniform and similar manner.

In view of this, the present invention proposes a lubricant system having a plurality of motor-driven pumps operating in parallel as main oil pumps, wherein even if at least one of the main oil pumps stops, the other normally operating main oil pumps do not stop due to overload of a motor.

Solution to Problem

In order to solve the above problems, a lubricant system according to the present invention comprises: a hydraulic pipeline; a plurality of pumps arranged parallel to the hydraulic pipeline; a plurality of motors driving each of the pumps; an error detector detecting a presence or absence of an error in an operating state of each of the motors; a pressure loss addition unit that increases pressure loss in the hydraulic pipeline; and a controller causing the pressure loss addition unit to increase pressure loss when an error is detected in at least one of the motors by the error detector, wherein when an error is detected in at least one of the motors, an working point of the pump driven by another of the motors is changed to a lower flow side than that in steady operation.

In a preferred embodiment of the lubricant system having the above characteristics, the pressure loss addition unit may be disposed closer to a downstream side than a joining portion on a discharge side of the plurality of pumps on the hydraulic pipeline.

Further, the pressure loss addition unit may comprise: a pressure regulating valve disposed in the hydraulic pipeline on a downstream side of the pump; a valve actuating hydraulic pipe communicatively connected to the hydraulic pipeline closer to the pump side than the pressure regulating valve; a valve actuation mechanism actuating the pressure regulating valve by hydraulic pressure supplied from the valve actuating hydraulic pipe; and a normally-closed solenoid valve disposed in the valve actuating hydraulic pipe, wherein the controller opens the solenoid valve to actuate the pressure regulating valve by discharge pressure of the pump and causes the pressure loss addition unit to increase pressure loss.

Further, the pressure loss addition unit may comprise: a pressure regulating valve disposed in the hydraulic pipeline on a downstream side of the pump; a gas tank storing high pressure gas; a valve actuating pipe communicatively connected to the gas tank; a valve actuation mechanism actuating the pressure regulating valve by gas supplied from the valve actuating pipe; and a normally-closed solenoid valve disposed in the valve actuating pipe, wherein the controller opens the solenoid valve to actuate the pressure regulating valve by the gas pressure and causes the pressure loss addition unit to increase pressure loss.

Furthermore, the pressure loss addition unit may comprise: a pressure regulating valve disposed in the hydraulic pipeline on a downstream side of the pump; a bypass pipe communicatively connecting an upstream and a downstream of the pressure regulating valve; and a normally-open solenoid valve disposed in the bypass pipe, wherein the controller closes the solenoid valve to close the bypass pipe and causes the pressure loss addition unit to increase pressure loss.

Advantageous Effects of Invention

The present invention proposes a lubricant system having a plurality of motor-driven pumps operating in parallel as main oil pumps, wherein even if at least one of the main oil pumps stops, the other normally operating main oil pumps do not stop due to overload of a motor.

DESCRIPTION OF EMBODIMENTS

Now, embodiments of the lubricant system according to the present invention will be described by referring to FIGS. 1 to 11.

Figure 1:
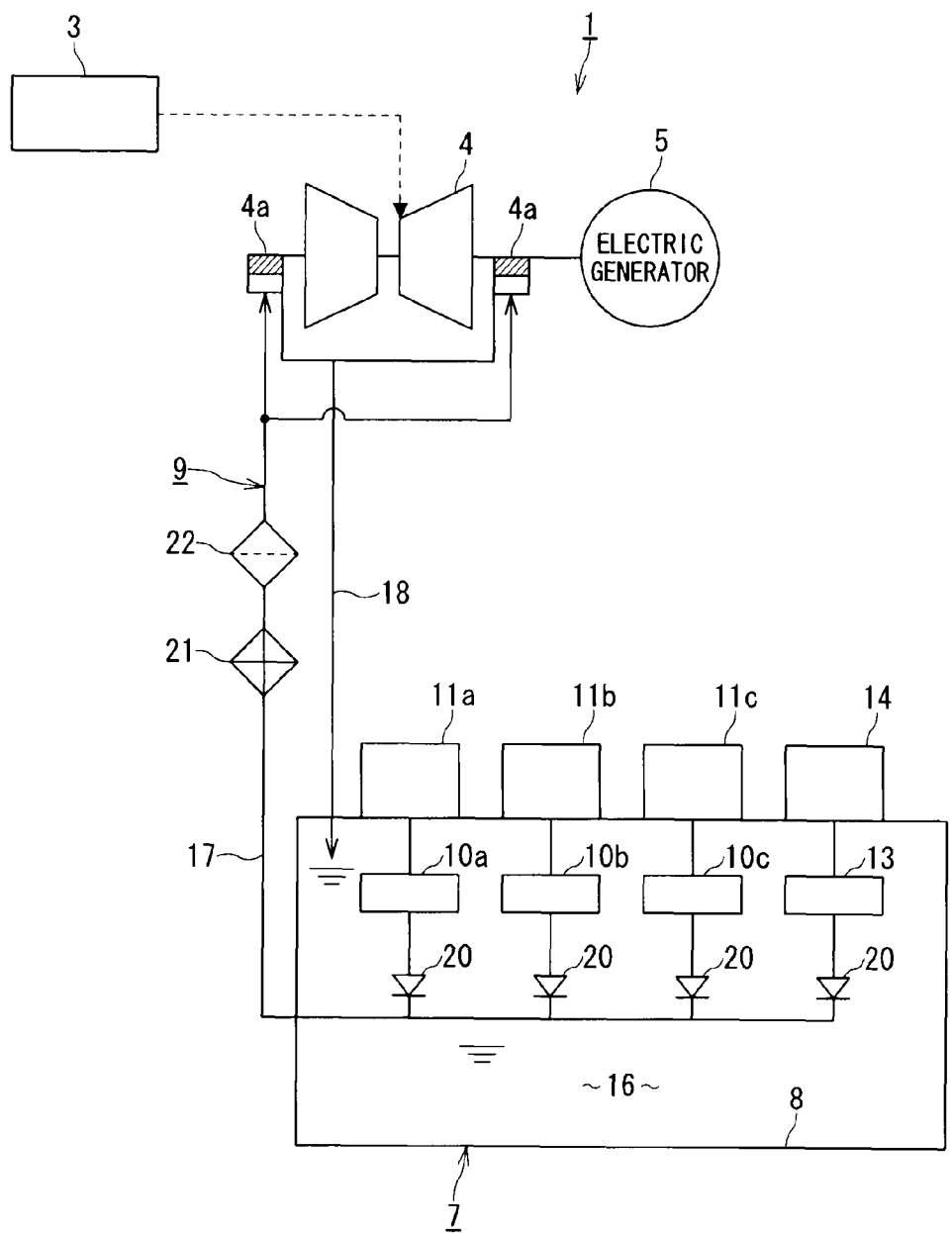
FIG. 1 is a system diagram illustrating a lubricant system according to the present invention configured as a power generation facility.

FIG. 1 is a system diagram illustrating a lubricant system according to the present invention configured as a power generation facility.

As illustrated in FIG. 1, a power generation facility 1 is used in, for example, a nuclear power plant and a thermal power plant. The power generation facility 1 comprises a steam generator 3, a steam turbine 4, an electric generator 5, and a lubricant system 7.

The steam generator 3 is used in, for example, a reactor in a nuclear power plant and a boiler in a thermal power plant to generate steam as working fluid for operating the steam turbine 4. The steam generated by the steam generator 3 is sent to the steam turbine 4.

The steam turbine 4 is rotatably supported by the turbine bearings 4a. The steam turbine 4 is rotatedly driven by the steam supplied from the steam generator 3. The rotational drive force of the steam turbine 4 is transmitted to the electric generator 5. The electric generator 5 is rotatedly driven by the steam turbine 4 to generate power.

The lubricant system 7 comprises an oil tank 8, a hydraulic pressure piping 9 (hydraulic pipeline), a plurality of lubricant pumps 10a, 10b, and 10c (main oil pumps), AC motors 11a, 11b, and 11c, an emergency lubricant pump 13, and a DC motor 14. The lubricant system 7 supplies a lubricant 16 to the turbine bearings 4a.

The oil tank 8 stores the lubricant 16 to be supplied to the turbine bearings 4a of the steam turbine 4. The hydraulic pressure piping 9 comprises a lubricant supply piping system 17 for guiding the lubricant 16 stored in the oil tank 8 to the turbine bearings 4a; and a lubricant return piping system 18 for returning the lubricant 16 after being used to lubricate the turbine bearings 4a back to the oil tank 8.

The lubricant pumps 10a, 10b, and 10c are arranged mutually parallel to the lubricant supply piping system 17. The lubricant pumps 10a, 10b, and 10c are directly connected to and driven by the AC motors 11a, 11b, and 11c respectively. Note that here three lubricant pumps 10a, 10b, and 10c are arranged in parallel, but two or more lubricant pumps may be arranged in parallel.

The emergency lubricant pump 13 is arranged in parallel together with the lubricant pumps 10a, 10b, and 10c. The emergency lubricant pump 13 is directly connected to and driven by the DC motor 14. The DC motor 14 is connected to an emergency DC power supply (unillustrated). The emergency lubricant pump 13 is a backup pump for use in supplying the lubricant 16 to the turbine bearings 4a instead of the lubricant pumps 10a, 10b, and 10c when the lubricant pumps 10a, 10b, and 10c are inoperable due to AC power loss of the lubricant system or before the lubricant system is activated.

Each of the lubricant pumps 10a, 10b, and 10c, and the emergency lubricant pump 13 is made of, for example, a centrifugal pump. In order to reduce the suction resistance, the lubricant pumps 10a, 10b, and 10c, and the emergency lubricant pump 13 are immersed in the lubricant 16 stored in the oil tank 8. Note, however, that the lubricant pumps 10a, 10b, and 10c, and the emergency lubricant pump 13 may be provided outside the oil tank 8.

The lubricant supply piping system 17 comprises check valves 20, an oil cooler 21, and a lubricant supply filter 22, each check valve being provided on each outlet side of the lubricant pumps 10a, 10b, and 10c, and the emergency lubricant pump 13.

In a steady operation of the lubricant system 7, the lubricant 16 is discharged from the lubricant pumps 10a, 10b, and 10c, passing through the lubricant supply piping system 17 from the check valves 20, the oil cooler 21, and the lubricant supply filter 22 in that order, and is supplied to the turbine bearings 4a. Subsequently, the lubricant 16 passes through the lubricant return piping system 18 and returns to the oil tank 8.

Figure 2:
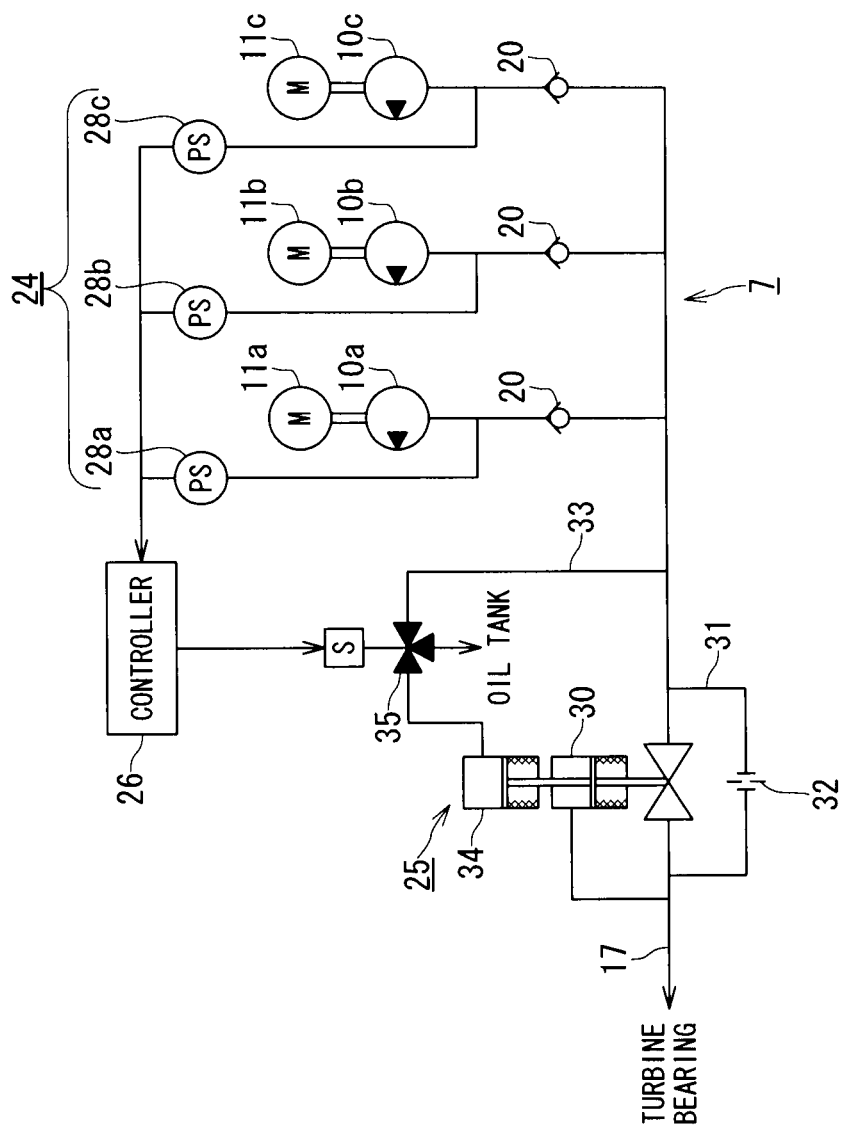
FIG. 2 is a system diagram illustrating the essential parts of the lubricant system according to the present embodiment.

FIG. 2 is a system diagram illustrating the essential parts of the lubricant system according to the present embodiment.

As illustrated in FIG. 2, the lubricant system 7 comprises: an error detector 24 checking each operating state of the AC motors 11a, 11b, and 11c to see whether or not an error occurs; a pressure loss addition unit 25 increasing pressure loss of the lubricant supply piping system 17 of the hydraulic pressure piping 9; and a controller 26 causing the pressure loss addition unit 25 to increase pressure loss when the error detector 24 detects an error in at least one of the AC motors 11a, 11b, and 11c.

The error detector 24 is disposed in the lubricant supply piping system 17. The error detector 24 has pressure switches 28a, 28b, and 28c each being provided on an outlet side of the lubricant pumps 10a, 10b, and 10c respectively. The error detector 24 determines whether or not an error occurs in the AC motors 11a, 11b, and 11c during operation by checking each discharge pressure of the lubricant pumps 10a, 10b, and 10c detected by the pressure switches 28a, 28b, and 28c respectively. Specifically, when the pressure on the discharge side of the lubricant pump 10a detected by the pressure switch 28a is approximately the same as that of the oil tank 8, the error detector 24 outputs an operation error signal of the AC motor 11a. The other pressure switches 28b and 28c are configured in the same manner as the pressure switch 28a.

The pressure loss addition unit 25 is disposed closer to the downstream side than a joining portion on the discharge side of the lubricant pumps 10a, 10b, and 10c in the lubricant supply piping system 17. The pressure loss addition unit 25 comprises: a pressure regulating valve 30 disposed in the lubricant supply piping system 17; a bypass pipe 31 communicatively connecting an upstream and a downstream of the pressure regulating valve 30; an orifice 32 disposed in the bypass pipe 31; a valve actuating hydraulic pipe 33 communicatively connected to the hydraulic pressure piping 9 at a position closer to the lubricant pumps 10a, 10b, and 10c than the pressure regulating valve 30; a valve actuation mechanism 34 actuating the pressure regulating valve 30 by hydraulic pressure supplied from the valve actuating hydraulic pipe 33; and a normally-closed solenoid valve 35 disposed in the valve actuating hydraulic pipe 33. When the solenoid valve 35 is opened, the pressure loss addition unit 25 actuates the valve actuation mechanism 34 by discharge pressure of the lubricant pumps 10a, 10b, and 10c to make a valve body (unillustrated) of the pressure regulating valve 30 closer to a valve seat (unillustrated). Thus, the pressure loss of the pressure loss addition unit 25 increases. An increase in pressure loss of the pressure loss addition unit 25 also increases the pressure loss of the entire lubricant supply piping system 17. The pressure regulating valve 30 has a valve actuation mechanism 30a. The valve actuation mechanism 30a is connected to a hydraulic pipe 17a branched from a secondary side (downstream side) of the pressure regulating valve 30 in the lubricant supply piping system 17. Thus, the pressure regulating valve 30 maintains constant pressure on the secondary side (downstream side) during steady operation.

When an operation error signal is received from the error detector 24, namely, when an error occurs in at least one of the AC motors 11a, 11b, and 11c, the controller 26 opens the solenoid valve 35 to cause the valve actuation mechanism 34 to actuate the pressure regulating valve 30 and causes the pressure loss addition unit 25 to increase pressure loss. Specifically, for example, when an error occurs in the AC motor 11a, in response to an operation error signal inputted from the pressure switch 28a, the controller 26 opens the solenoid valve 35 to cause the pressure loss addition unit 25 to increase pressure loss. Thus, the controller 26 changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7, particularly pressure loss of the lubricant supply piping system 17 so as not to allow the power required for the other AC motors (e.g., the AC motors 11b and 11c) to exceed the rated power.

Figure 3:
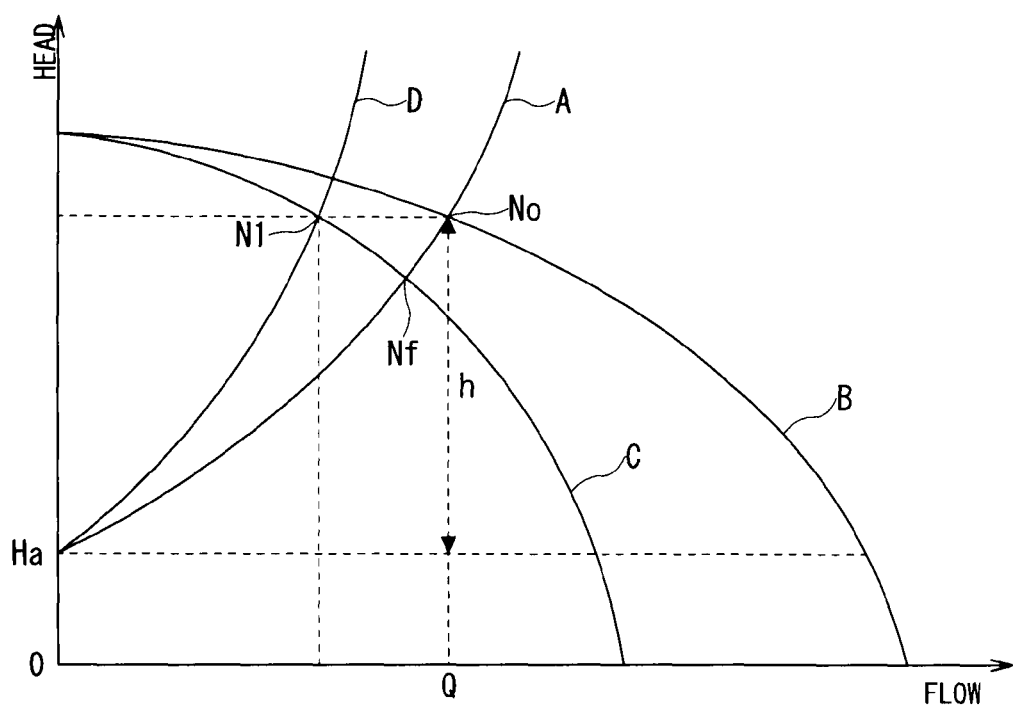
FIG. 3 is a graph illustrating characteristics of a lubricant pump of the lubricant system according to the present embodiment.

FIG. 3 is a graph illustrating characteristics of a lubricant pump of the lubricant system according to the present embodiment.

Here, when attention is paid to the lubricant 16 supplied to turbine bearings 4a by the lubricant pumps 10a, 10b, and 10c or the emergency lubricant pump 13, the actual pump head of the lubricant system 7 is represented by a actual pump head Ha of the lubricant supply piping system 17, and the pressure loss of the lubricant system 7 is represented by a total loss h of the lubricant supply piping system 17.

As illustrated in FIG. 3, when all the lubricant pumps 10a, 10b, and 10c are operating normally, a load curve (solid line A in FIG. 3) of the lubricant system 7 represented by the lubricant supply piping system 17 and a head-capacity curve (solid line B in FIG. 3) as the entire lubricant pumps 10 are crossed at an working point N0. At this time, the total head H as the entire lubricant pumps 10 corresponds to a sum of the actual pump head Ha of the lubricant supply piping system 17 and the total loss h. A total discharge flow rate Q as the entire lubricant pumps 10 corresponds to a sum of each of the discharge flow rates Q1, Q2, and Q3 of the lubricant pumps 10a, 10b, and 10c respectively.

Then, when at least one of the lubricant pumps 10a, 10b, and 10c, for example, the lubricant pump 10a stops, the head-capacity curve (solid line C in FIG. 3) as the entire lubricant pumps 10 including the lubricant pumps 10b and 10c during error operation moves to a low flow side.

At this time, in a conventional lubricant system, the load curve (solid line A in FIG. 3) and the head-capacity curve (solid line C in FIG. 3) are crossed at an working point Nf. At the working point Nf, the discharge flow rate per one of the lubricant pumps 10b and 10c increases in comparison with the discharge flow rate during normal operation and thus the power required for the AC motors 11b and 11c to drive the lubricant pumps 10b and 10c also increases.

In light of this, the lubricant system 7 according to the present embodiment is configured such that when the error detector 24 detects an error in the lubricant pump 10a, the controller 26 drives the pressure loss addition unit 25 to increase the pressure loss of the lubricant supply piping system 17 so as to change the load curve (solid line D in FIG. 3) of the lubricant system 7 to a low flow side.

Then, the load curve (solid line D in FIG. 3) of the lubricant system 7 in which the pressure loss increases and the head-capacity curve (solid line C in FIG. 3) as the entire lubricant pumps 10 during error operation are crossed at an working point N1. At this time, the total head H as the entire lubricant pumps 10 corresponds to the sum of the actual pump head Ha and the total loss h of the lubricant supply piping system 17. Each discharge flow rate of the lubricant pumps 10b and 10c is adjusted to, for example, about a discharge flow rate of Q2 and Q3 respectively during normal operation. Note that each discharge flow rate of the lubricant pumps 10b and 10c during normal operation may be adjusted to a discharge flow rate of less than Q2 and Q3 respectively during normal operation.

Note that the foregoing description of the lubricant system 7 according to the present embodiment focuses on three lubricant pumps 10 operating in parallel, but when two or more lubricant pumps 10 operate in parallel, the pressure loss addition unit 25 may control the pressure loss (the number of lubricant pumps 10 minus one in steps).

Figure 4:
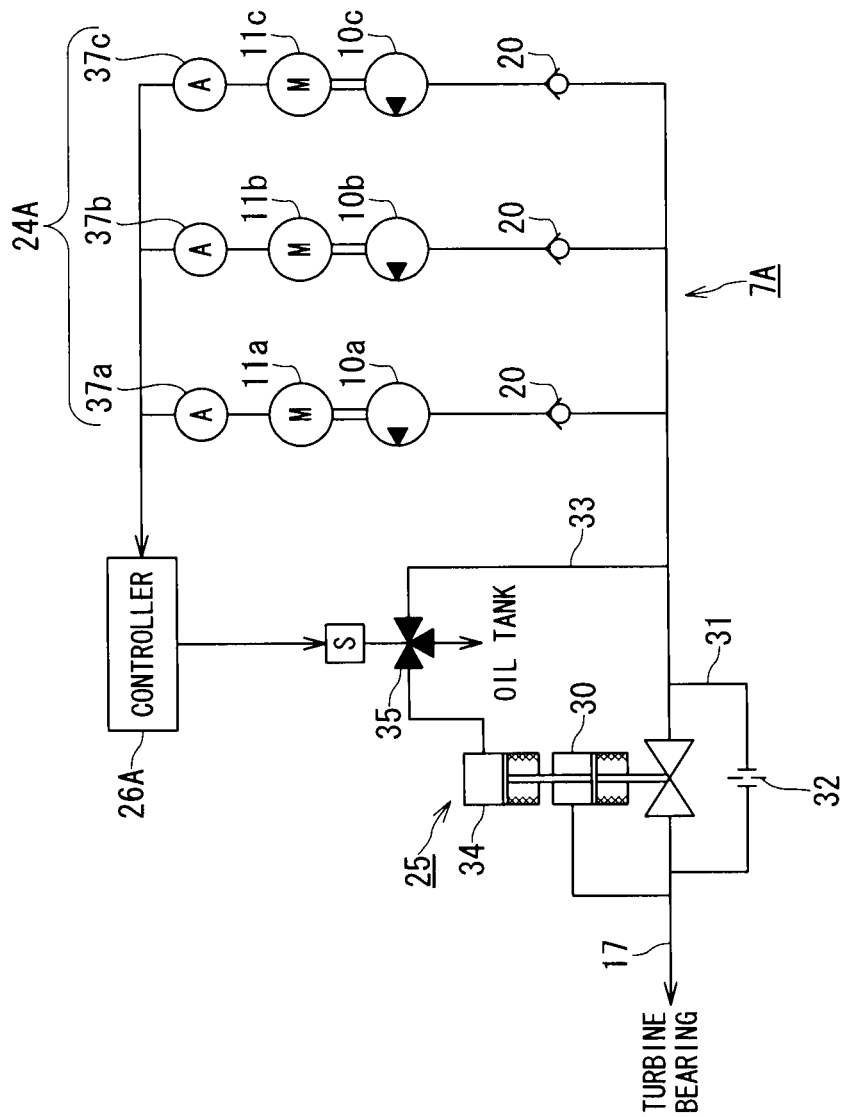
FIG. 4 is a system diagram illustrating another example of the essential parts of the lubricant system according to the present embodiment.

FIG. 4 is a system diagram illustrating another example of the essential parts of the lubricant system according to the present embodiment.

In the lubricant system 7A according to the present embodiment, the same reference numeral or character is assigned to a component having the same configuration as that in the lubricant system 7 and the duplicate description is omitted.

As illustrated in FIG. 4, a lubricant system 7A has an error detector 24A including ammeters 37a, 37b, and 37c which are disposed in AC motors 11a, 11b, and 11c to measure each current value of the AC motors 11a, 11b, and 11c respectively. The error detector 24A detects whether or not an error occurs in the AC motors 11a, 11b, and 11c during operation by checking each current value of the AC motors 11a, 11b, and 11c detected by the ammeters 37a, 37b, and 37c respectively.

When at least one current value of the AC motors 11a, 11b, and 11c detected by the error detector 24A is approximately 0 A, the controller 26A opens the solenoid valve 35 to cause the valve actuation mechanism 34 to drive the pressure regulating valve 30 to cause the pressure loss addition unit 25 to increase the pressure loss. Specifically, when an error occurs, for example, in the AC motor 11a, based on the current value (approximately 0 A) of the ammeter 37a, the controller 26A opens the solenoid valve 35 to cause the pressure loss addition unit 25 to increase the pressure loss. Thus, the controller 26A changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7A, particularly pressure loss of the lubricant supply piping system 17 so as not to allow the power required for the other AC motors (e.g., the AC motors 11b and 11c) to exceed the rated power.

Figure 5:
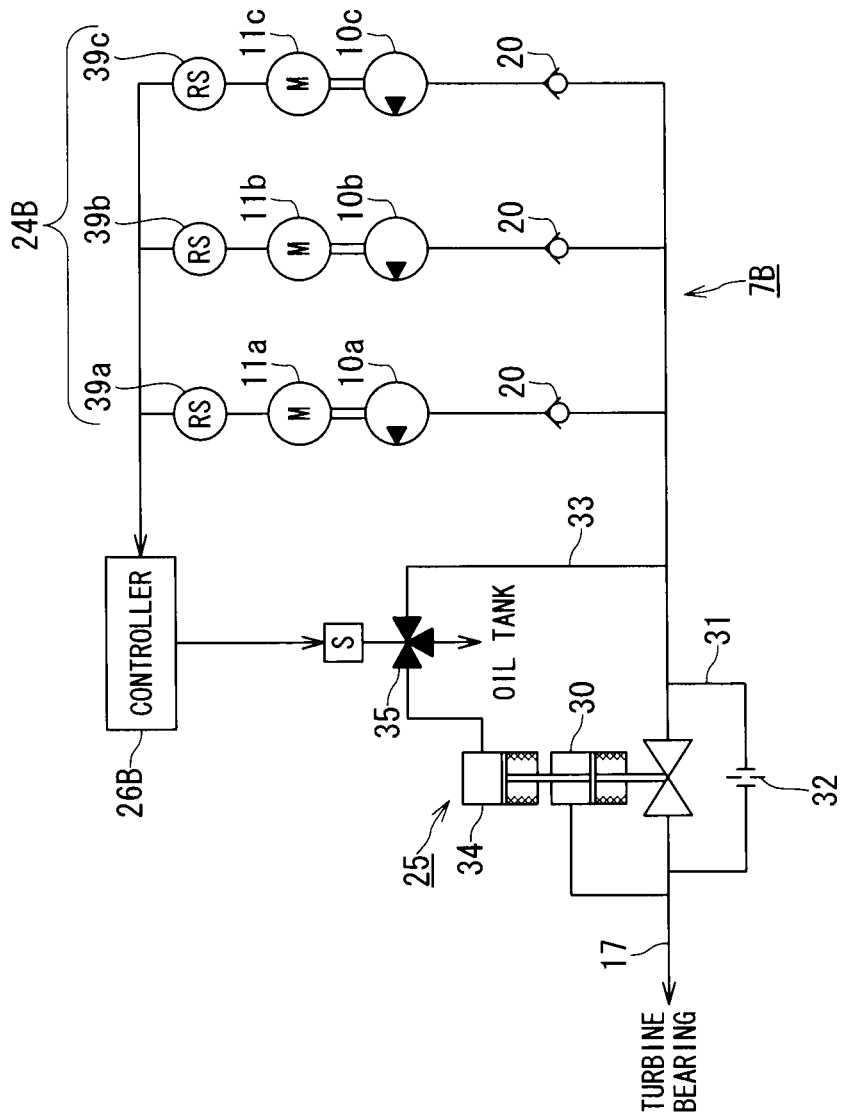
FIG. 5 is a system diagram illustrating still another example of the essential parts of the lubricant system according to the present embodiment.

FIG. 5 is a system diagram illustrating still another example of the essential parts of the lubricant system according to the present embodiment.

In the lubricant system 7B according to the present embodiment, the same reference numeral or character is assigned to a component having the same configuration as that in the lubricant system 7 and the duplicate description is omitted.

As illustrated in FIG. 5, a lubricant system 7B has an error detector 24B including tachometers 39a, 39b, and 39c which are disposed in AC motors 11a, 11b, and 11c to measure each rotation speed of the AC motors 11a, 11b, and 11c. The error detector 24B detects whether or not an error occurs in the AC motors 11a, 11b, and 11c during operation by checking each rotation speed of the AC motors 11a, 11b, and 11c detected by the tachometers 39a, 39b, and 39c.

When at least one rotation speed of the AC motors 11a, 11b, and 11c detected by the error detector 24B is approximately 0 rpm, the controller 26B opens the solenoid valve 35 to cause the valve actuation mechanism 34 to drive the pressure regulating valve 30 to cause the pressure loss addition unit 25 to increase the pressure loss. Specifically, when an error occurs, for example, in the AC motor 11a, based on the rotation speed (approximately 0 rpm) of the tachometer 39a, the controller 26B opens the solenoid valve 35 to cause the pressure loss addition unit 25 to increase the pressure loss. Thus, the controller 26B changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7B, particularly pressure loss of the lubricant supply piping system 17 so as not to allow the power required for the other AC motors (e.g., the AC motors 11b and 11c) to exceed the rated power.

Figure 6:
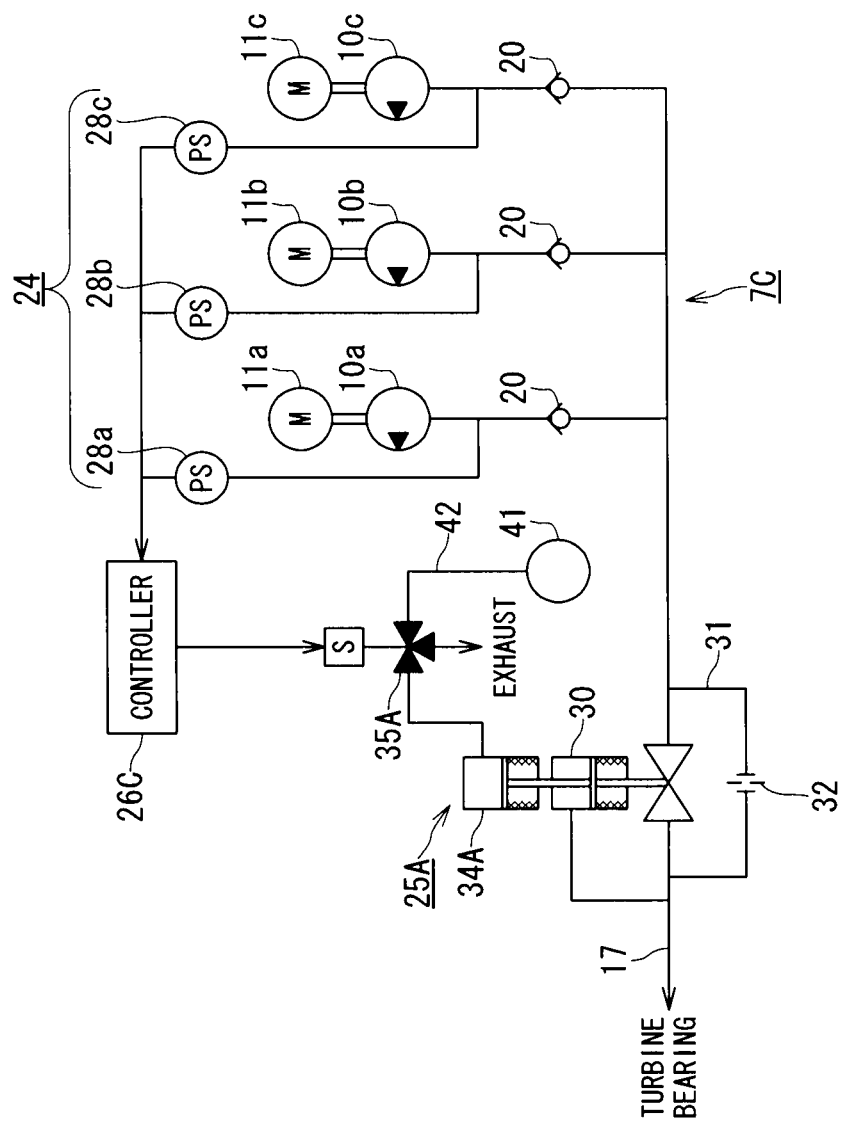
FIG. 6 is a system diagram illustrating yet another example of the essential parts of the lubricant system according to the present embodiment.

FIG. 6 is a system diagram illustrating yet another example of the essential parts of the lubricant system according to the present embodiment.

In the lubricant system 7C according to the present embodiment, the same reference numeral or character is assigned to a component having the same configuration as that in the lubricant system 7 and the duplicate description is omitted.

As illustrated in FIG. 6, the pressure loss addition unit 25A of the lubricant system 7C comprises: a pressure regulating valve 30 disposed in the lubricant supply piping system 17; a bypass pipe 31 communicatively connecting an upstream and a downstream of the pressure regulating valve 30; an orifice 32 disposed in the bypass pipe 31; a gas tank 41 storing high pressure gas; a valve actuating pipe 42 communicatively connected to the gas tank 41; a valve actuation mechanism 34A actuating the pressure regulating valve 30 by gas supplied from the valve actuating pipe 42; and a normally-closed solenoid valve 35A disposed in the valve actuating pipe 42. When the solenoid valve 35A is opened, the pressure loss addition unit 25A drives the valve actuation mechanism 34A by the pressure of the gas stored in the gas tank 41 to cause a valve body of the pressure regulating valve 30 to be close to a valve seat. Thus, the pressure loss of the pressure loss addition unit 25A increases. An increase in pressure loss of the pressure loss addition unit 25A also increases the pressure loss of the entire lubricant supply piping system 17.

When an operation error signal is received from the error detector 24, namely, when an error occurs in at least one of the AC motors 11a, 11b, and 11c, the controller 26C opens the solenoid valve 35A to cause the valve actuation mechanism 34A to actuate the pressure regulating valve 30 and to cause the pressure loss addition unit 25A to increase pressure loss. Specifically, for example, when an error occurs in the AC motor 11a, in response to an operation error signal inputted from the pressure switch 28a, the controller 26C opens the solenoid valve 35A to cause the pressure loss addition unit 25A to increase pressure loss. Thus, the controller 26C changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7C, particularly pressure loss of the lubricant supply piping system 17 so as not to allow the power required for the other AC motors (e.g., the AC motors 11b and 11c) to exceed the rated power.

Figure 7:
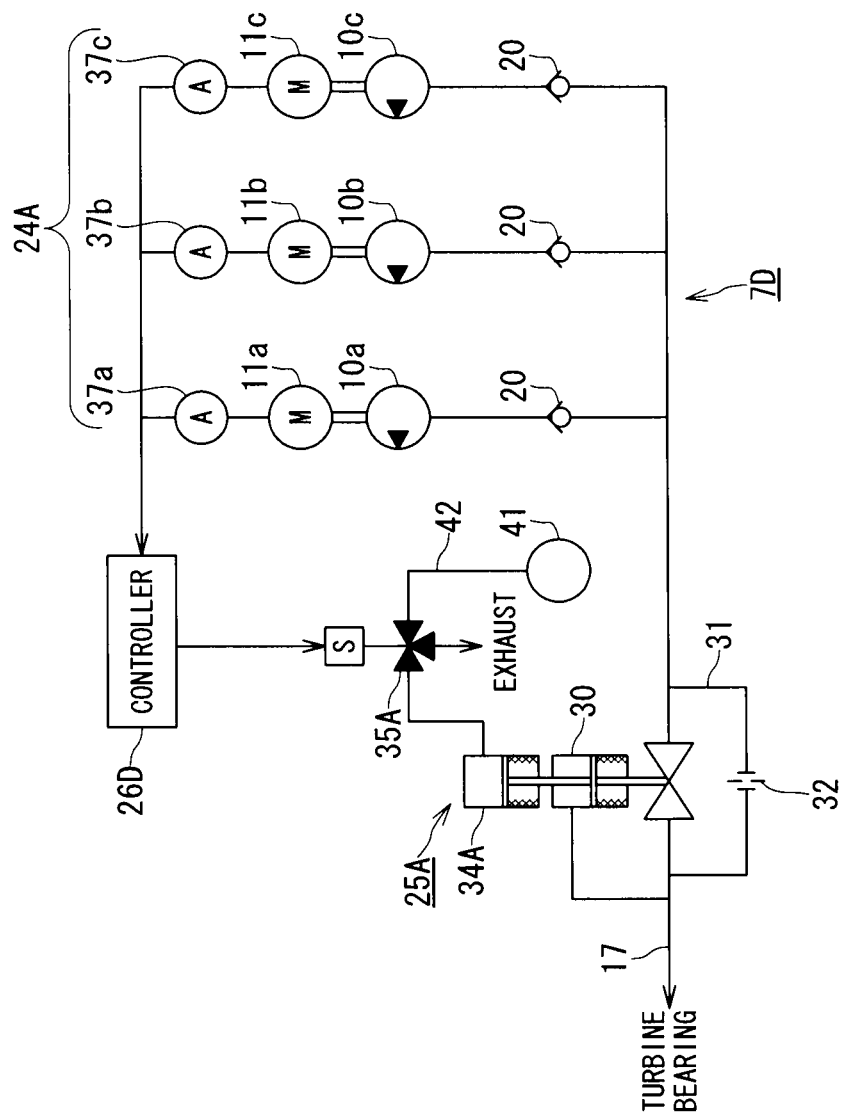
FIG. 7 is a system diagram illustrating still yet another example of the essential parts of the lubricant system according to the present embodiment.

FIG. 7 is a system diagram illustrating still yet another example of the essential parts of the lubricant system according to the present embodiment.

In the lubricant system 7D according to the present embodiment, the same reference numeral or character is assigned to a component having the same configuration as that in the lubricant system 7C and the duplicate description is omitted.

As illustrated in FIG. 7, the lubricant system 7D uses the error detector 24A instead of the error detector 24 of the lubricant system 7C. Specifically, the error detector 24A of the lubricant system 7D includes ammeters 37a, 37b, and 37c which are disposed in AC motors 11a, 11b, and 11c to measure each current value of the AC motors 11a, 11b, and 11c respectively. The error detector 24A detects whether or not an error occurs in the AC motors 11a, 11b, and 11c during operation by checking each current value of the AC motors 11a, 11b, and 11c detected by the ammeters 37a, 37b, and 37c respectively.

When at least one current value of the AC motors 11a, 11b, and 11c detected by the error detector 24A is approximately 0 A, the controller 26D opens the solenoid valve 35A to cause the valve actuation mechanism 34A to drive the pressure regulating valve 30 to cause the pressure loss addition unit 25A to increase the pressure loss. Specifically, when an error occurs, for example, in the AC motor 11a, based on the current value (approximately 0 A) of the ammeter 37a, the controller 26D opens the solenoid valve 35A to cause the pressure loss addition unit 25A to increase the pressure loss. Thus, the controller 26D changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7D, particularly pressure loss of the lubricant supply piping system 17 so as not to allow the power required for the other AC motors (e.g., the AC motors 11b and 11c) to exceed the rated power.

Figure 8:
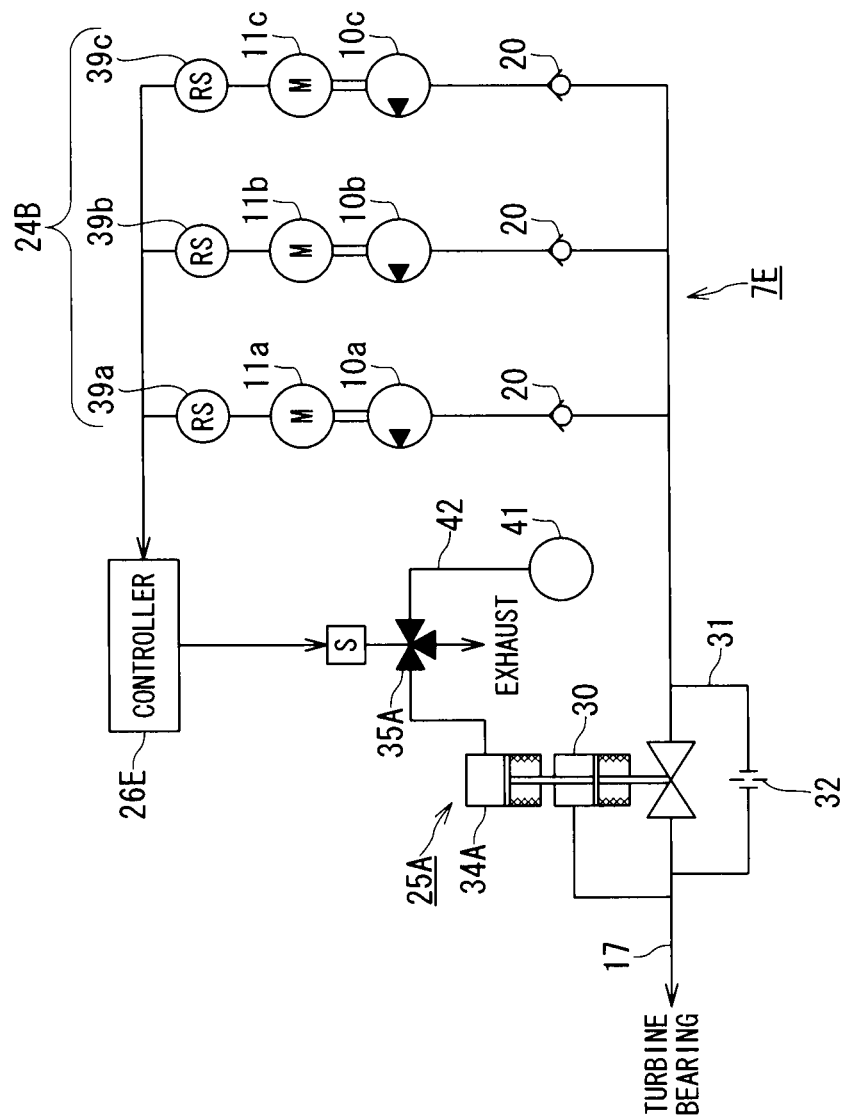
FIG. 8 is a system diagram illustrating yet still another example of the essential parts of the lubricant system according to the present embodiment.

FIG. 8 is a system diagram illustrating yet still another example of the essential parts of the lubricant system according to the present embodiment.

In the lubricant system 7E according to the present embodiment, the same reference numeral or character is assigned to a component having the same configuration as that in the lubricant system 7C and the duplicate description is omitted.

As illustrated in FIG. 8, the lubricant system 7E uses the error detector 24B instead of the error detector 24 of the lubricant system 7C. Specifically, the error detector 24B of the lubricant system 7E includes tachometers 39a, 39b, and 39c which are disposed in AC motors 11a, 11b, and 11c to measure each rotation speed of the AC motors 11a, 11b, and 11c. The error detector 24B detects whether or not an error occurs in the AC motors 11a, 11b, and 11c during operation by checking each rotation speed of the AC motors 11a, 11b, and 11c detected by the tachometers 39a, 39b, and 39c.

When at least one rotation speed of the AC motors 11a, 11b, and 11c detected by the error detector 24B is approximately 0 rpm, the controller 26E opens the solenoid valve 35A to cause the valve actuation mechanism 34A to drive the pressure regulating valve 30 to cause the pressure loss addition unit 25A to increase the pressure loss. Specifically, when an error occurs, for example, in the AC motor 11a, based on the rotation speed (approximately 0 rpm) of the tachometer 39a, the controller 26E opens the solenoid valve 35A to cause the pressure loss addition unit 25A to increase the pressure loss. Thus, the controller 26E changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7E, particularly pressure loss of the lubricant supply piping system 17 so as not to allow the power required for the other AC motors (e.g., the AC motors 11b and 11c) to exceed the rated power.

Figure 9:
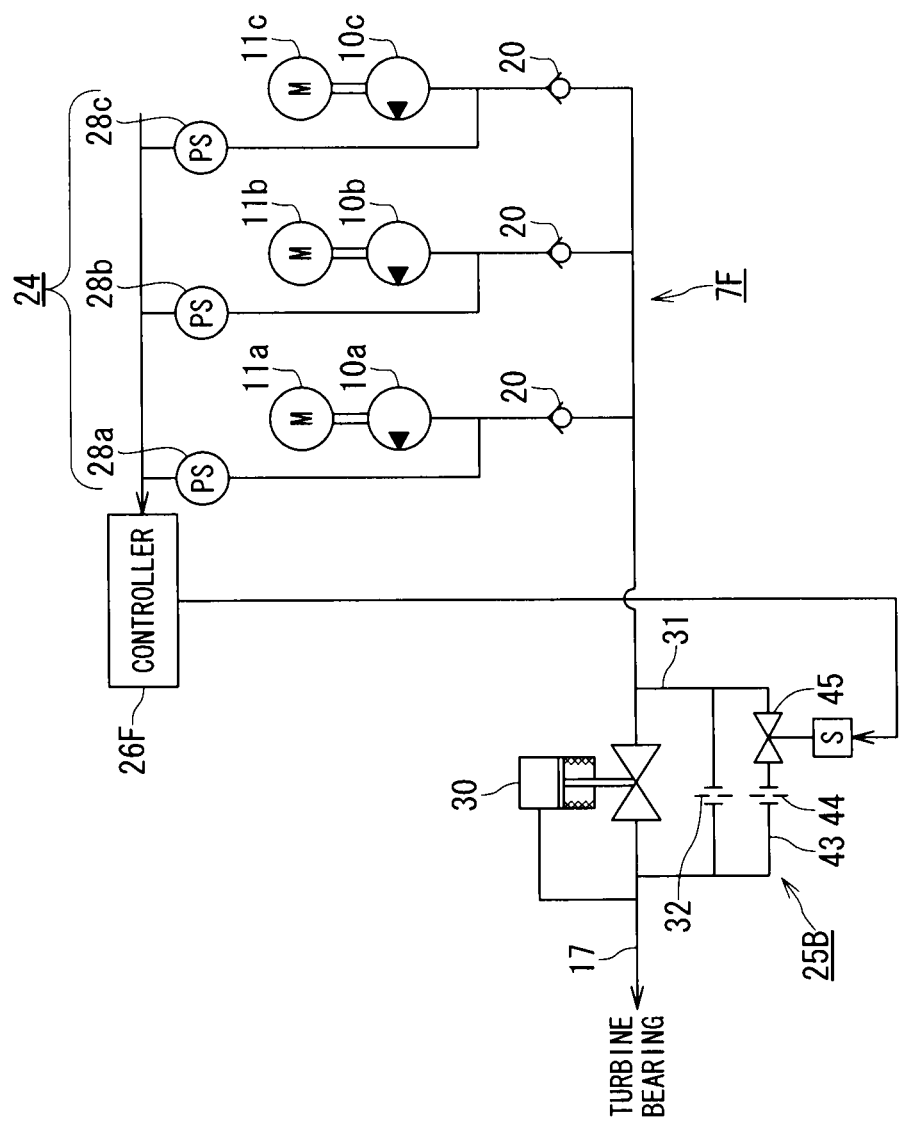
FIG. 9 is a system diagram illustrating further another example of the essential parts of the lubricant system according to the present embodiment.

FIG. 9 is a system diagram illustrating further another example of the essential parts of the lubricant system according to the present embodiment.

In the lubricant system 7F according to the present embodiment, the same reference numeral or character is assigned to a component having the same configuration as that in the lubricant system 7 and the duplicate description is omitted.

As illustrated in FIG. 9, the pressure loss addition unit 25B of the lubricant system 7F comprises: a pressure regulating valve 30 disposed in the lubricant supply piping system 17; a bypass pipe 31 communicatively connecting an upstream and a downstream of the pressure regulating valve 30; an orifice 32 disposed in the bypass pipe 31; a pressure loss control bypass pipe 43 which is disposed in parallel to the bypass pipe 31 to communicatively connect an upstream and a downstream of the pressure regulating valve 30; an orifice 44 disposed in the pressure loss control bypass pipe 43; and a normally-open solenoid valve 45 disposed in the pressure loss control bypass pipe 43. When the solenoid valve 45 is closed, the pressure loss addition unit 25B closes the piping system including the pressure loss control bypass pipe 43 and the orifice 44. Thus, the pressure loss of the pressure loss addition unit 25B increases. An increase in pressure loss of the pressure loss addition unit 25B also increases the pressure loss of the entire lubricant supply piping system 17.

When an operation error signal is received from the error detector 24, namely, when an error occurs in at least one of the AC motors 11a, 11b, and 11c, the controller 26F closes the solenoid valve 45 to cause the pressure loss addition unit 25B to increase pressure loss. Specifically, for example, when an error occurs in the AC motor 11a, in response to an operation error signal inputted from the pressure switch 28a, the controller 26F closes the solenoid valve 45 cause the pressure loss addition unit 25B to increase pressure loss. Thus, the controller 26F changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7F, particularly pressure loss of the lubricant supply piping system 17 so as not to allow the power required for the other AC motors (e.g., the AC motors 11b and 11c) to exceed the rated power.

Figure 10:
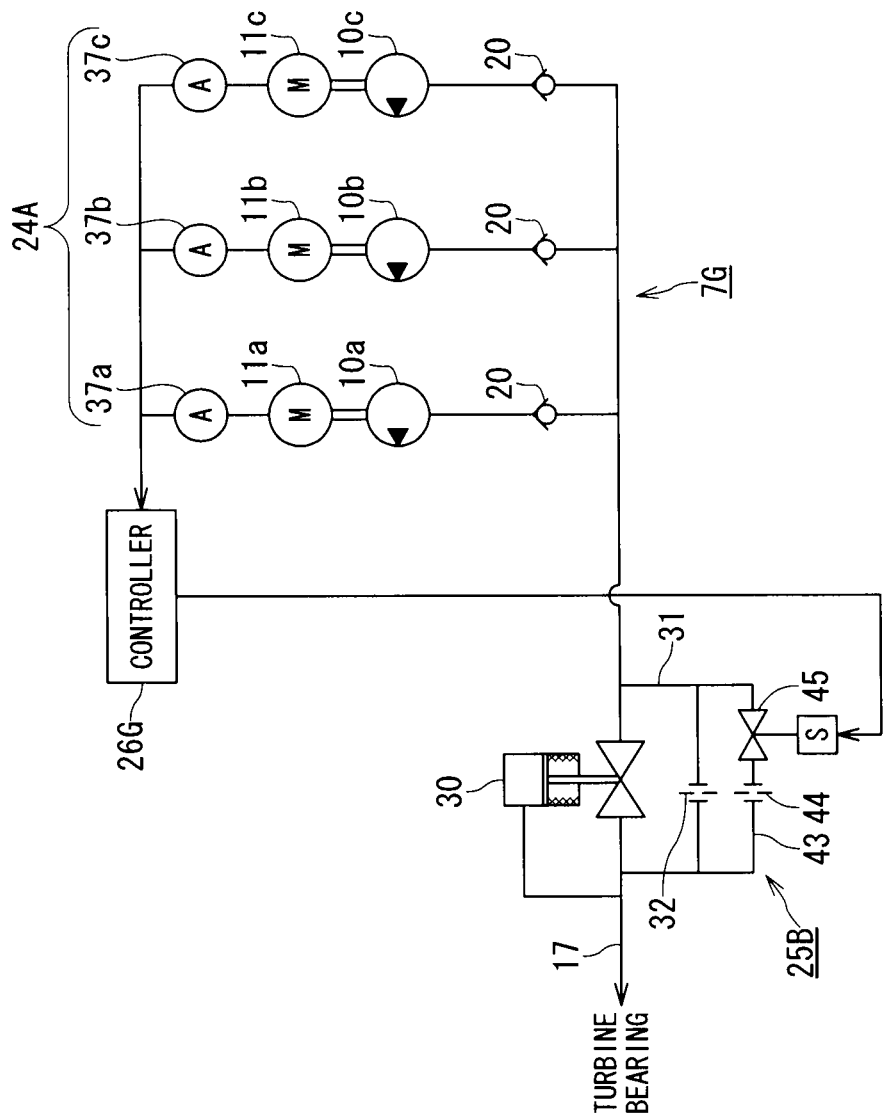
FIG. 10 is a system diagram illustrating further yet another example of the essential parts of the lubricant system according to the present embodiment.

FIG. 10 is a system diagram illustrating further yet another example of the essential parts of the lubricant system according to the present embodiment.

In the lubricant system 7G according to the present embodiment, the same reference numeral or character is assigned to a component having the same configuration as that in the lubricant system 7F and the duplicate description is omitted.

As illustrated in FIG. 10, the lubricant system 7G uses the error detector 24A instead of the error detector 24 of the lubricant system 7F. Specifically, the error detector 24A of the lubricant system 7G includes ammeters 37a, 37b, and 37c which are disposed in AC motors 11a, 11b, and 11c to measure each current value of the AC motors 11a, 11b, and 11c respectively. The error detector 24A detects whether or not an error occurs in the AC motors 11a, 11b, and 11c during operation by checking each current value of the AC motors 11a, 11b, and 11c detected by the ammeters 37a, 37b, and 37c respectively.

When at least one current value of the AC motors 11a, 11b, and 11c detected by the error detector 24A is approximately 0 A, the controller 26G closes the solenoid valve 45 to cause the pressure loss addition unit 25B to increase the pressure loss. Specifically, when an error occurs, for example, in the AC motor 11a, based on the current value (approximately 0 A) of the ammeter 37a, the controller 26G closes the solenoid valve 45 to cause the pressure loss addition unit 25B to increase the pressure loss. Thus, the controller 26G changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7G, particularly pressure loss of the lubricant supply piping system 17 so as not to allow the power required for the other AC motors (e.g., the AC motors 11b and 11c) to exceed the rated power.

Figure 11:
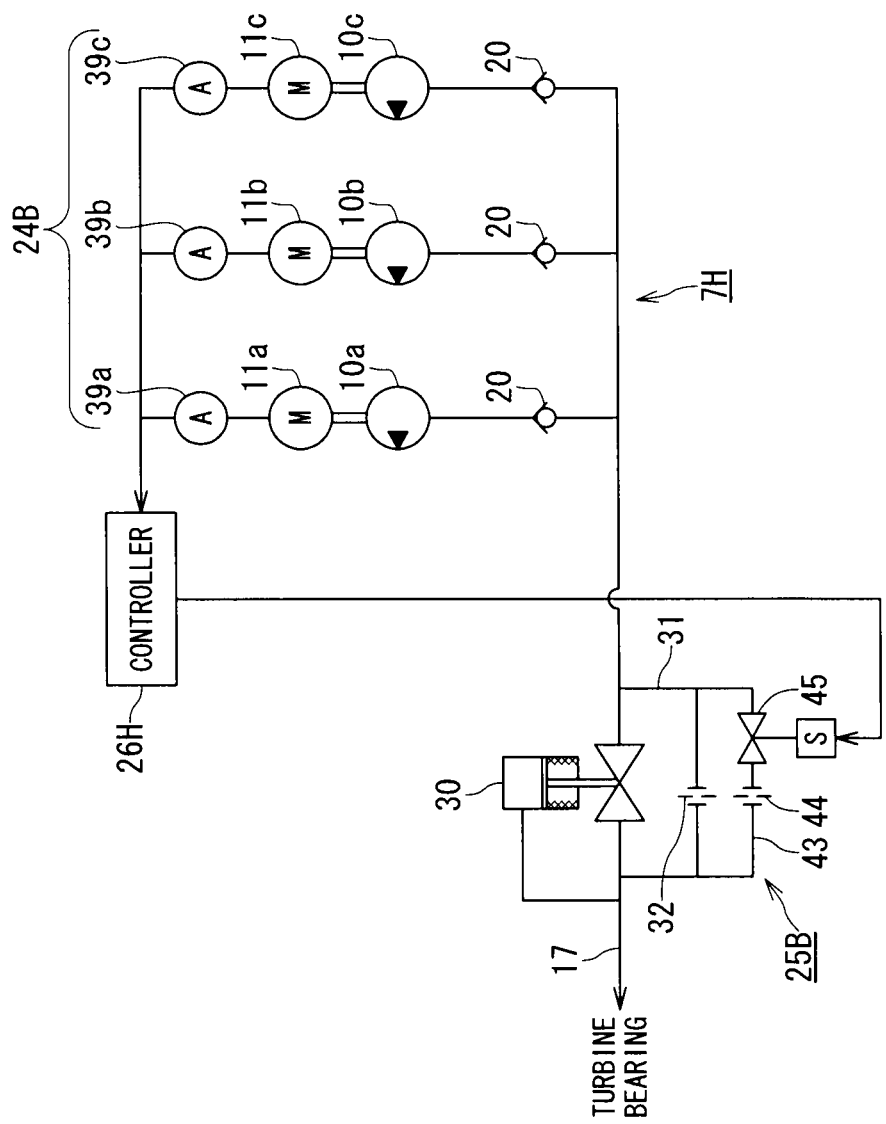
FIG. 11 is a system diagram illustrating further still yet another example of the essential parts of the lubricant system according to the present embodiment.

FIG. 11 is a system diagram illustrating further still yet another example of the essential parts of the lubricant system according to the present embodiment.

In the lubricant system 7H according to the present embodiment, the same reference numeral or character is assigned to a component having the same configuration as that in the lubricant system 7F and the duplicate description is omitted.

As illustrated in FIG. 11, the lubricant system 7H uses the error detector 24B instead of the error detector 24 of the lubricant system 7F. Specifically, the error detector 24B of the lubricant system 7H includes tachometers 39a, 39b, and 39c which are disposed in AC motors 11a, 11b, and 11c to measure each rotation speed of the AC motors 11a, 11b, and 11c. The error detector 24B detects whether or not an error occurs in the AC motors 11a, 11b, and 11c during operation by checking each rotation speed of the AC motors 11a, 11b, and 11c detected by the tachometers 39a, 39b, and 39c.

When at least one rotation speed of the AC motors 11a, 11b, and 11c detected by the error detector 24B is approximately 0 rpm, the controller 26H closes the solenoid valve 45 to cause the pressure loss addition unit 25B to increase the pressure loss. Specifically, when an error occurs, for example, in the AC motor 11a, based on the rotation speed (approximately 0 rpm) of the tachometer 39a, the controller 26H closes the solenoid valve 45 to cause the pressure loss addition unit 25B to increase the pressure loss. Thus, the controller 26H changes each working point of the lubricant pumps (e.g., the lubricant pumps 10b and 10c) driven by the other AC motors (e.g., the AC motors 11b and 11c) respectively to a lower flow side than that in steady operation to increase pressure loss of the lubricant system 7H, particularly pressure loss of the lubricant supply piping system 17 so as not to allow the power required for the other AC motors (e.g., the AC motors 11b and 11c) to exceed the rated power.

As thus configured, the lubricant systems 7, 7A, 7B, 7C, 7D, 7E, 7F, 7G, and 7H according to the present embodiment include the lubricant pumps 10 operating in parallel. Even if an error occurs in at least one of the lubricant pumps 10, the systems continue operation of the other normal lubricant pumps 10 without overloading the AC motors 11 driving the lubricant pumps 10. In other word, the lubricant systems 7, 7A, 7B, 7C, 7D, 7E, 7F, 7G, and 7H enable small capacity lubricant pumps to be adopted by parallel operating the lubricant pumps 10 to solve the problem with a large-sized lubricant pump of the conventional lubricant system.

Further, in response to an error in a lubricant pump 10, the lubricant systems 7, 7A, 7B, 7C, 7D, 7E, 7F, 7G, and 7H increase each pressure loss of the lubricant systems 7, 7A, 7B, 7C, 7D, 7E, 7F, 7G, and 7H respectively to reliably enable the continued operation of the normally operating lubricant pumps 10. That is, the lubricant systems 7, 7A, 7B, 7C, 7D, 7E, 7F, 7G, and 7H provide sufficient advantages in adopting small capacity lubricant pumps.

Thus, the steam turbine 4 having one of the lubricant systems 7, 7A, 7B, 7C, 7D, 7E, 7F, 7G, and 7H provides reliable and continued lubrication of the turbine bearing 4a, thus remarkably reducing the possibility of damage.

Thus, the lubricant systems 7, 7A, 7B, 7C, 7D, 7E, 7F, 7G, and 7H according to the present embodiment has a plurality of lubricant pumps 10 operating in parallel, wherein even if at least one of the lubricant pumps 10 stops, the other normally operating lubricant pumps 10 do not stop due to overload of an AC motor 11.

The invention claimed is:

1. A lubricant system comprising:
a hydraulic pipeline;
a plurality of pumps arranged parallel to the hydraulic pipeline;
a plurality of motors, each driving one of the pumps;
an error detector detecting a presence or absence of an error in an operating state of each of the motors;
a pressure loss addition unit that increases pressure loss in the hydraulic pipeline; and
wherein the pressure loss addition unit increases pressure loss when an error is detected in at least one of the motors by the error detector, wherein
when an error is detected in at least one of the motors, a working point on a head capacity curve of pumps driven by the other motors is changed from a normal flow rate point in steady operation to a lower flow rate point determined depending on the pressure loss increased by the pressure loss addition unit.

2. The lubricant system according to claim 1, wherein the pressure loss addition unit is disposed closer to a downstream side than a joining portion on a discharge side of the plurality of pumps on the hydraulic pipeline.

3. The lubricant system according to claim 1, wherein the pressure loss addition unit comprises:
a pressure regulating valve disposed in the hydraulic pipeline on a downstream side of the plurality of pumps;
a valve actuating hydraulic pipe communicatively connected to the hydraulic pipeline closer to the pumps than the pressure regulating valve;
a valve actuation mechanism actuating the pressure regulating valve by hydraulic pressure supplied from the valve actuating hydraulic pipe; and
a normally-closed solenoid valve disposed in the valve actuating hydraulic pipe, wherein
the solenoid valve is opened to actuate the pressure regulating valve by discharge pressure of the plurality of pumps and the pressure loss addition unit increases pressure loss.

4. The lubricant system according to claim 1, wherein the pressure loss addition unit comprises:
a pressure regulating valve disposed in the hydraulic pipeline on a downstream side of the pumps;
a gas tank storing high pressure gas;
a valve actuating pipe communicatively connected to the gas tank;
a valve actuation mechanism actuating the pressure regulating valve by gas supplied from the valve actuating pipe; and
a normally-closed solenoid valve disposed in the valve actuating pipe, wherein
the solenoid valve opens to actuate the pressure regulating valve by the gas pressure and the pressure loss addition unit increases pressure loss.

5. The lubricant system according to claim 1, wherein the pressure loss addition unit comprises:
a pressure regulating valve disposed in the hydraulic pipeline on a downstream side of the pumps;
a bypass pipe communicatively connecting an upstream and a downstream of the pressure regulating valve; and
a normally-open solenoid valve disposed in the bypass pipe, wherein
the solenoid valve closes the bypass pipe and the pressure loss addition unit increases pressure loss.

6. The lubricant system according to claim 1, wherein the error detector includes a pressure switch detecting a presence or absence of discharge pressure of the pumps.

7. The lubricant system according to claim 1, wherein the error detector includes an ammeter detecting current flowing in each of the motors.

8. The lubricant system according to claim 1, wherein the error detector includes a tachometer detecting a rotation speed of each of the motors.

* * * * *